United States Patent
Copty et al.

(10) Patent No.: US 10,657,257 B2
(45) Date of Patent: May 19, 2020

(54) FEATURE VECTOR AGGREGATION FOR MALWARE DETECTION

(71) Applicant: International Business Machines Corporation, Armonk, NY (US)

(72) Inventors: Fady Copty, Nazareth (IL); Cynthia Eisner, Zichron Yaacov (IL); Dov Murik, Haifa (IL); Tamer Salman, Haifa (IL)

(73) Assignee: International Business Machines Corporation, Armonk, NY (US)

(*) Notice: Subject to any disclaimer, the term of this patent is extended or adjusted under 35 U.S.C. 154(b) by 345 days.

(21) Appl. No.: 15/832,832

(22) Filed: Dec. 6, 2017

(65) Prior Publication Data
US 2019/0171816 A1 Jun. 6, 2019

(51) Int. Cl.
*G06F 21/56* (2013.01)
*G06N 5/04* (2006.01)
*G06N 20/00* (2019.01)

(52) U.S. Cl.
CPC .............. *G06F 21/566* (2013.01); *G06N 5/04* (2013.01); *G06N 20/00* (2019.01); *G06F 2221/033* (2013.01)

(58) Field of Classification Search
CPC . G06F 21/566; G06F 2221/033; G06N 20/00; G06N 5/04
See application file for complete search history.

(56) References Cited

U.S. PATENT DOCUMENTS

| | | | | |
|---|---|---|---|---|
| 7,284,274 | B1* | 10/2007 | Walls | G06F 8/70 726/25 |
| 7,900,193 | B1* | 3/2011 | Kolawa | G06F 11/3604 717/126 |
| 8,949,994 | B2 | 2/2015 | Amit et al. | |
| 9,507,943 | B1* | 11/2016 | Allen | G06F 21/577 |
| 9,817,974 | B1* | 11/2017 | Huang | G06F 21/563 |
| 10,432,648 | B1* | 10/2019 | Xu | H04L 63/145 |

(Continued)

OTHER PUBLICATIONS

Firdausi et al., "Analysis of Machine learning Techniques Used in Behavior-Based Malware Detection", 2010 Second International Conference on Advances in Computing, Control, and Telecommunication Technologies, Dec. 2010, pp. 201-203.

(Continued)

*Primary Examiner* — Theodore C Parsons
*Assistant Examiner* — Thomas Ho
(74) *Attorney, Agent, or Firm* — Ziv Glazberg

(57) ABSTRACT

A method, apparatus and product performing feature vector aggregation for malware detection. Two sets of measurements produced by a two dynamic analyses of an examined program are obtained, wherein the two dynamic analyses are performed with respect to the examined program executing two different execution paths. An aggregated feature vector representing the examined program is generated. The aggregated feature vector comprises a set of aggregated features, wherein a value of each aggregated feature is based on an aggregation of corresponding measurements in the first set of measurements and in the second set of measurements. A predictive model is applied on the aggregated feature vector to classify the examined program as malicious or benign.

20 Claims, 4 Drawing Sheets

(56) References Cited

U.S. PATENT DOCUMENTS

| | | | |
|---|---|---|---|
| 2009/0037885 A1* | 2/2009 | Edwards | G06F 11/3688 |
| | | | 717/128 |
| 2011/0321001 A1* | 12/2011 | Dutta | G06F 8/75 |
| | | | 717/105 |
| 2015/0106943 A1 | 4/2015 | Tripp et al. | |
| 2016/0004864 A1 | 1/2016 | Falk et al. | |
| 2016/0021174 A1* | 1/2016 | De Los Santos Vilchez | |
| | | | H04L 43/10 |
| | | | 709/201 |
| 2016/0371490 A1 | 12/2016 | Shakarian et al. | |
| 2017/0193225 A1* | 7/2017 | Moon | G06F 21/55 |
| 2017/0206350 A1* | 7/2017 | Salajegheh | G06F 21/552 |
| 2018/0115574 A1* | 4/2018 | Ridley | H04L 63/1425 |
| 2018/0285567 A1* | 10/2018 | Raman | G06F 21/566 |

OTHER PUBLICATIONS

Santos et al., "OPEM: A Static-Dynamic Approach for Machine-Learning-Based Malware Detection", International Joint Conference CISIS'12-ICEUTE'12-SOCO'12 Special Sessions, 2012, pp. 271-280.

Rieck et al., "Automatic Analysis of Malware Behavior using Machine Learning", Journal of Computer Security, Dec. 2011, pp. 639-668, vol. 19, Issue 4.

Rieck et al., "Learning and Classification of Malware Behavior", Detection of Intrusions and Malware, and Vulnerability Assessment, 2008, pp. 108-125.

* cited by examiner

ABSTRACT # FEATURE VECTOR AGGREGATION FOR MALWARE DETECTION

TECHNICAL FIELD

The present disclosure relates to malware detection in general, and to malware detection using machine learning techniques, in particular.

BACKGROUND

Proliferation of malware poses a major threat to modern computerized system of all sizes and shapes. Malware has evolved into a powerful instrument for illegal commercial activity, and significant effort is made by its authors to thwart detection by anti-malware products. Malware is used in fraud, espionage, and in other illegal activities. The malware penetrates the computerized system by exploiting its vulnerabilities, or the vulnerabilities of the people operating it. After the malware has penetrated the system, it may attempt to manipulate data, retrieve confidential information, activate malicious functionalities, or the like.

As a result, malware detection is an important branch of cyber security of every system. One long prevailing technique of malware detection is based on manual identification of malware and extraction of identifiable signatures to be used to identify the same malware on different systems. Such solution relies heavily on expert knowledge and on the ability of human experts to manually inspect software, and is thus not scalable.

BRIEF SUMMARY

One exemplary embodiment of the disclosed subject matter is a method comprising: obtaining a first set of measurements produced by a first dynamic analysis of an examined program, wherein the first dynamic analysis is performed with respect to the examined program executing a first execution path; obtaining a second set of measurements produced by a second dynamic analysis of the examined program, wherein the second dynamic analysis is performed with respect to the examined program executing a second execution path, wherein the first and second execution paths are different; generating an aggregated feature vector representing the examined program, wherein the aggregated feature vector comprises a set of aggregated features, wherein a value of each aggregated feature is based on an aggregation of corresponding measurements in the first set of measurements and in the second set of measurements; and applying a predictive model on the aggregated feature vector to classify the examined program as malicious or benign.

Another exemplary embodiment of the disclosed subject matter is a computer program product comprising a computer readable storage medium retaining program instructions, which program instructions when read by a processor, cause the processor to perform a method comprising: obtaining a first set of measurements produced by a first dynamic analysis of an examined program, wherein the first dynamic analysis is performed with respect to the examined program executing a first execution path; obtaining a second set of measurements produced by a second dynamic analysis of the examined program, wherein the second dynamic analysis is performed with respect to the examined program executing a second execution path, wherein the first and second execution paths are different; generating an aggregated feature vector representing the examined program, wherein the aggregated feature vector comprises a set of aggregated features, wherein a value of each aggregated feature is based on an aggregation of corresponding measurements in the first set of measurements and in the second set of measurements; and applying a predictive model on the aggregated feature vector to classify the examined program as malicious or benign.

Yet another exemplary embodiment of the disclosed subject matter is a computerized apparatus having a processor, the processor being adapted to perform the steps of: obtaining a first set of measurements produced by a first dynamic analysis of an examined program, wherein the first dynamic analysis is performed with respect to the examined program executing a first execution path; obtaining a second set of measurements produced by a second dynamic analysis of the examined program, wherein the second dynamic analysis is performed with respect to the examined program executing a second execution path, wherein the first and second execution paths are different; generating an aggregated feature vector representing the examined program, wherein the aggregated feature vector comprises a set of aggregated features, wherein a value of each aggregated feature is based on an aggregation of corresponding measurements in the first set of measurements and in the second set of measurements; and applying a predictive model on the aggregated feature vector to classify the examined program as malicious or benign.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
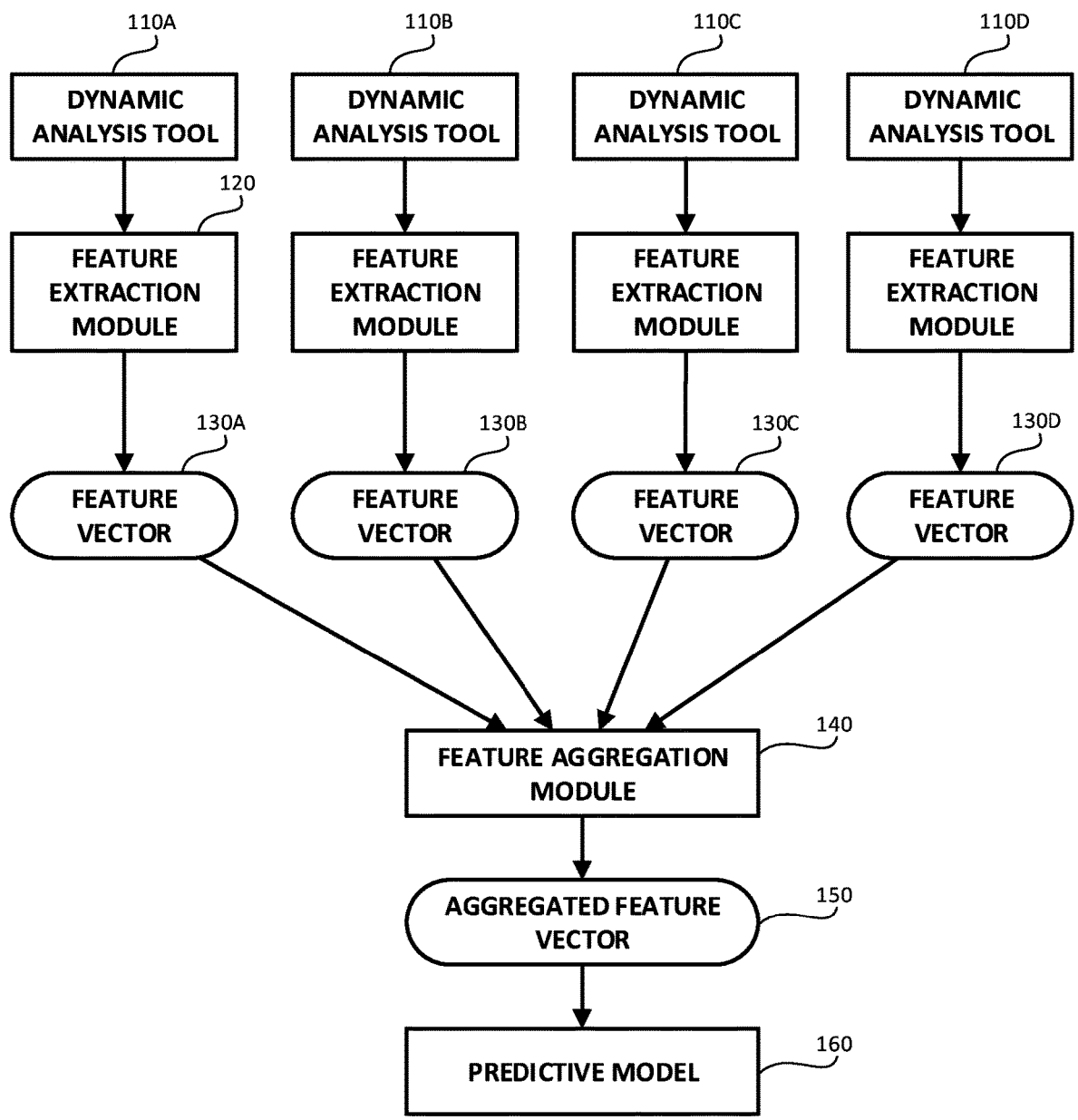
FIG. 1 shows a schematic illustration of a system, in accordance with the disclosed subject matter.

One technical problem dealt with by the disclosed subject matter is to provide for dynamic analysis-based classification of malware. Dynamic analysis tools are configured to execute or emulate execution of a program and monitor the activity thereof during execution. In some cases, dynamic analysis tools execute the program within a sandbox so as to prevent the program from performing malicious activities in case it is a malware. In some exemplary embodiments, the dynamic analysis tool may monitor the execution and output a log of monitored events, such as invocations of instructions and functions, coverage information, resource utilization, or the like. The log may be analyzed to classify the program as either malware of benign. In some cases, the analysis may allow identification of a malware family to which the program belongs.

Another technical problem is to be able to detect malware even if such malware exhibits, in some executions, purely benign functionality.

Some malware may be equipped with anti-research capabilities and may employ evasion techniques to avoid exposing its malicious payload. During some executions, the malware may exhibit malicious functionality, while in others it may appear harmless. Executions which follow one execution path (i.e., a sequence of instructions in a Control Flow Graph (CFG) of the program) may appear to be harmless and may not expose the malicious payload, while executions following a different execution path of the program may perform the malicious functionality.

Yet another technical problem is to be able to avoid high dimensionality of a feature vector that is based on a plurality of executions of the program, while still retaining sufficient information to enable accurate classification. Feature vector that would include information regarding different executions may potentially comprise N features for each execution. If M executions are analyzed, the feature vector would be of size N×M which in many cases would be too high for any machine learning technique to provide accurate classifications.

One technical solution is to utilize measurements produced during several dynamic analysis processing runs. In some cases, the examined program may be analyzed using different dynamic analysis tools, using different configurations of the dynamic analysis tools, using pseudo-random parameters affecting execution of the program by the same tool using the same configuration or the like. The different executions may execute different execution paths, at least some of which may not exhibit any malicious functionality, regardless of whether the examined program is malware. Using the measurements obtained during the dynamic analysis phase, an aggregated feature vector may be generated. The aggregated feature vector may comprise aggregated features. An aggregate feature may be a feature whose value depends on an aggregation of corresponding measurement in the different executions. Hence, instead of representing an aspect of the M executions using M features, the single aggregated feature is used to represent an aggregation of an aspect of the M executions, while still preserving sufficient information to allow accurate classification. The aggregated feature may be a feature that would be indicative of whether a malicious functionality was exhibited in any of the executions. In some exemplary embodiments, a large number of benign executions may be exhibited, however their measurements should not overshadow measurements of a single malicious execution.

It is noted that the aggregated feature vector may comprise additional features that may not be aggregated, such as features relating to static information that are indifferent to the execution (e.g., file name, linked libraries, permissions, or the like).

The aggregated feature vector may be used to represent the examined program for classification. A prediction model may be configured to process instances, each of which is represented by an aggregated feature vector, for classification, prediction, or other determinations.

In some exemplary embodiments, a training set of programs may be available. Each program may be labeled as benign or malicious. However, not every execution is labeled. Manually labeling each execution may not be feasible, and would not be scalable. Instead, the disclosed subject matter may utilize the label of the program with respect to an aggregation of the executions, some of which may be malicious while others—benign, to train a predictive model that can classify programs using aggregated feature vectors that are generated based on a plurality of dynamically analyzed executions.

In some exemplary embodiments, the disclosed subject matter may be applied in unsupervised learning, such as by utilizing the aggregated feature vector for representing an instance and classifying instances based on distance measurements between instances.

In some exemplary embodiments, different aggregated features may be employed. Below non-limiting examples of aggregated features are disclosed. Such features were exhibited to assist in training predictive models of relatively high accuracy.

In some exemplary embodiments, the aggregated feature may aggregate numeric features of each analyzed execution. In some exemplary embodiments, the aggregation may be performed using a statistical measurement, such as a minimal value, a maximal value, a mean value, a standard deviation, or the like. Additional numeric aggregation may be, for example, ratio of non-zero occurrences. As an example, a feature counting a number of occurrences of a certain event, a maximum or minimum value may be derived over all execution logs. In case of a measurement counting a number of unique Uniform Resource Identifiers (URIs) in each execution, the maximal number of unique URIs. Additionally or alternatively, a ratio of non-zero URI count paths may be computed. Such a feature may be indicative of an attempt by the examined program to hide its malicious payload as in a relatively significant portion of the executions, the URI that is used to contact the owner of the malware is not contacted at all. A low rate may be indicative of an attempt to hide the malicious payload. However, it will be noted that in some cases, dynamic analysis tools may be efficient in invoking malicious activity and exposing the malicious payload. In such cases, the ratio may be high.

In some exemplary embodiments, additional aggregated features may be produced to embody properties relating to all the execution logs together. Different information may be merged together using a union operation, an intersection operation, a top-K operation, or the like.

In some exemplary embodiments, an aggregated Uniform Resource Identifier (URI) feature may be utilized. The aggregated URI feature may comprise a list of all URIs contacted by any execution of the examined program, in any execution path. As the aggregated URI feature comprises a union of all URIs contacted, if as part of malicious activity, a URI is contacted, such behavior would be represented by the value of the aggregated URI feature. In some exemplary embodiments, a feature deriving number of unique URIs contact in all of the different execution logs may also be utilized.

In some exemplary embodiments, computations may be performed on the aggregated information itself. For example, a union of lists of URIs may be analyzed to compute a number of unique URIs in all different execution logs.

In some exemplary embodiments, the aggregated feature may be an aggregated created file feature, indicating a list of all files created by the examined program in any of the execution paths. Additionally or alternatively, a feature counting the number of unique files created in all executions may be computed. Additionally or alternatively, a feature counting the ratio of non-zero occurrences where files were created.

In some exemplary embodiments, the aggregated feature may be aggregated functionality count, such as a number of occurrences in all executions where a functionality was encountered. As an example, the functionality may be an invocation of a WinAPI functions, a UNIX system call, another Application Programming Interface (API) function of an Operating System (OS), a CPU opcode (e.g., ADD, MOV, JMP), another hardware instruction or the like. Additionally or alternatively, the functionality may be a malicious pattern. The malicious pattern may be a pattern of operations that provides for a malicious functionality. In some cases, some malicious patterns may be used for non-malicious purposes, and the pattern may thus provide a non-conclusive indication of malware. The malicious pattern may comprise a pattern of operations, which may or may not depend on the context of the executed program. As an example, the pattern may depend on content of environment variables, of memory regions (e.g., regions pointed to by a parameter provided to a function), or the like. Additionally or alternatively, the functionality may be an anti-debug pattern. The anti-debug pattern may be a predetermined pattern of instructions or operations that are known to be associated with an attempt by a malware to avoid detection of its malicious payload, such as by making it difficult for a reviewer to identify the malicious payload. The anti-debug pattern may be used in other scenarios, which may not necessarily be associated with an attempt to hide functionality, and as a result may be a non-conclusive indication of malware. In some exemplary embodiments, the anti-debug pattern may depend on the context of the executed program. In some exemplary embodiments, the anti-debug pattern and/or the malicious pattern may be identified by a dynamic analysis tool, or by a tool reviewing the log file produced thereby.

In some exemplary embodiments, an n-gram count feature may be used. The n-gram count feature may comprise a number of times a sequence of size n (e.g., 1-gram, 2-gram, 3-gram, or the like) of functionalities was encountered in all the execution paths. For example, a 2-gram feature for the sequence (write, read) may indicate how many times a write operation was followed by a read operation. Various n-gram features may be used to potentially identify execution patterns that are indicative of malicious activity.

In some exemplary embodiments, the aggregated feature may be an aggregated memory entropy feature. In some exemplary embodiments, the aggregated memory entropy feature may indicate an aggregated entropy of dynamically created memory during execution in all of the execution paths. In some exemplary embodiments, an entropy of a snapshot of the memory may be computed. In some cases, multiple entropies may be computed for each execution, at different times. The aggregated entropy may be a maximal value of all computed entropies of all executions. High entropy may be indicative of encrypted data, which may be an indication that the program has a potentially malicious functionality.

In some exemplary embodiments, the aggregated feature may be a maximal string deviation feature. The maximal string deviation feature may comprises a maximal deviation of strings that are dynamically created during execution in all of the execution paths. The deviation may be computed based on a statistical measurement of the strings (e.g., a representative string), from static strings, or the like. Such analysis of strings may be useful in uncovering a malicious execution path.

In some exemplary embodiments, the aggregated feature may aggregate coverage of calls to API functions of the OS (e.g., coverage of WinAPI calls) or hardware instructions (e.g., coverage of CPU opcodes). In some exemplary embodiments, a first order statistics of the coverage may be computed.

In some exemplary embodiments, some measurements may be static and consistent in all execution paths, such as measurements relating to metadata of the executable file. Such measurements may be used as is and not aggregated. Additionally or alternatively, such measurements may be used in a sanity check to ensure that all dynamically analyzed executions are of the same examined program.

One technical effect may be dimensionality reduction of the model used by the prediction model. Dimensionality reduction may enable machine learning techniques to become feasible and provide accurate results in real-life examples.

Another technical effect may be to provide for an abstraction of the complete feature vector comprising identical features for each execution. The abstraction may be an abstraction that preserves information useful in exposing malicious activity even if such activity occurs in a small fraction of the execution paths examined. In some cases, as it is unknown how many execution paths there are, the number of total features if each execution path is represented using a different feature, is unknown and the predictive model could not be trained accordingly in advanced. The abstraction may be useful in overcoming this challenge.

Yet another technical effect may be to enable supervised learning while relying on approximated labels. The label of the labeled program may indicate that some, not all, of the execution paths thereof exhibit malicious functionality. In that sense, it may be an approximation to use the label of the program with relation to an aggregation of executions relating to potentially different executions paths, even if some of the execution paths are benign.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing a schematic illustration of a system, in accordance with the disclosed subject matter.

Dynamic Analysis Tools 110A, 110B, 110C, 110D are used to perform dynamic analysis on a program. The figure shows four different tools, however, any number of tools may be used. The program may be an examined program, which is being examined as to whether it is malware or benign. The classification may be performed using a Predictive Model 160. Predictive Model 160 may be any predictive model, including a predictive model implementing unsupervised learning, such as clustering, a predictive model implementing supervised learning, or the like. Additionally or alternatively, the program may be a labeled program, for which it a label indicating malware/benign is already present, and which is used in supervised learning to train Predictive Model 160.

In some exemplary embodiments, Dynamic Analysis Tools 110A, 110B, 110C, 110D may be the same tool used with different configurations, the same tool which has non-deterministic or pseudo-random analysis so that in different invocations it potentially causes a different execution of the program, different tools, or the like. Each tool may invoke a different execution path of the program. In some cases, some execution paths may be benign, while other may perform malicious functionality.

The tools may provide log or other report of the measurements they have recorded during execution of the program. In some cases, a Feature Extraction Module 120 may be configured to extract Feature Vectors 130A, 130B, 130C, 130D from the reports. Each Feature Vector 130A, 130B, 130C, 130D may represent the measurements of a different execution. Hence, each Feature Vector 130A, 130B, 130C, 130D may represent measurements recorded with respect to an execution of a potentially different execution path.

Feature Aggregation Module 140 may be configured to generate an Aggregated Feature Vector 150. The Feature Aggregation Module 140 may aggregate corresponding features from Feature Vectors 130A, 130B, 130C, 130D to create a single aggregated feature. In some cases, the aggregated feature may be a computation performed based on an aggregation, such as size-of computation to a feature comprising a set of values, where the set is created by unifying four sets, each from a different feature vector.

It will be noted that in some exemplary embodiments, the outcome of the dynamic analysis tool may be processed directly by feature aggregation module and without formally constructing Feature Vectors 130A, 130B, 130C, 130D.

The Aggregated Feature Vector 150 may be fed into Predictive Model 160. Predictive Model 160 may be configured to be trained using a pair of Aggregated Feature Vector 150 and corresponding label. Additionally or alternatively, Predictive Model 160 may be configured to classify the examined program using Aggregated Feature Vector 150. In some cases, Aggregated Feature Vector 150 may be used to represent a program using one data point instead of a plurality of potential data points (e.g., Feature Vectors 130A, 130B, 130C, 130D).

Figure 2A:
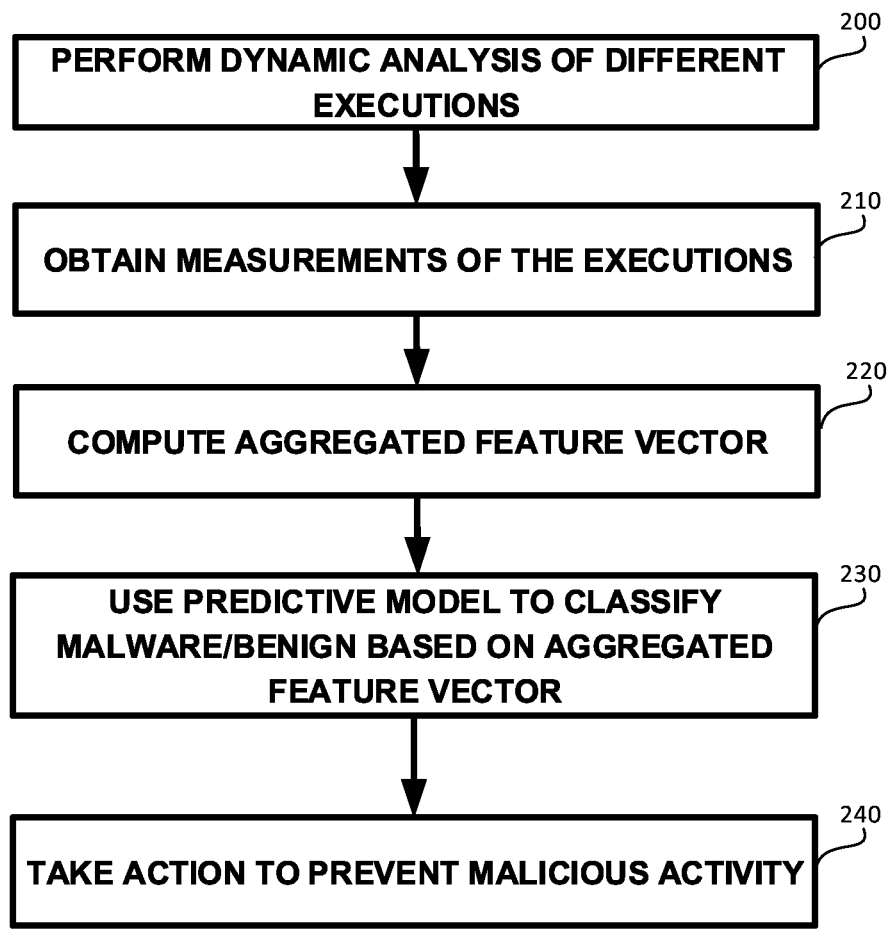
FIGS. 2A-2B show flowchart diagrams of methods, in accordance with the disclosed subject matter.

Referring now to FIG. 2A showing a flowchart diagram of a method, in accordance with the disclosed subject matter.

On Step 200, a plurality of dynamic analyses may be performed with respect to an examined program. Each dynamic analysis may be performed by a different tool, using different configuration, or otherwise configured to stimulate different functionality of the examined program. In some exemplary embodiments, each analysis may be performed with respect to an execution that follows a different execution path in the CFG of the examined program. In some cases, it may be verified that a different execution path was followed, such as using instrumentations to monitor executed basic blocks and order thereof. In other cases, it may be assumed that different execution paths are executed. It will be noted that some malware programs may employ anti-research measures to prevent monitoring thereof, such as anti-debug pattern, so that when instrumentation is introduced into the malware, the malware may not exhibit its malicious payload.

On Step 210, measurements of each analysis may be obtained. The measurements may be obtained from a report comprising a log of monitored events. In some cases, the measurements may be a feature vector extracted from the report.

On Step 220, an aggregated feature vector may be generated. The aggregated feature vector may comprise one or more aggregated features, that value of which is computed based on measurements of a plurality of different executions (and as a result, potentially different execution paths).

On Step 230, a predictive model may be used to classify the program as malware or benign. The aggregated feature vector may be fed into the predictive model for classification. The classification may be performed using supervised learning methods, such that the predictive model may be a-priori trained as is exemplified in FIG. 2B below. Additionally or alternatively, the classification may be performed using unsupervised learning methods. One example may be using clustering to determine clusters of similar programs, and later on detecting which of the clusters groups malware programs and which group benign programs.

On Step 240, in case of a detection of malware, a preventive measurement may be taken. The action taken may be deleting the malware, quarantining the malware, generating a signature of the malware and broadcasting it to anti-malware tools, providing the malware to a human researcher for validation (the validation results may be used to improve the prediction model such as by updating the training set with programs that were classified incorrectly), or the like.

Figure 2B:
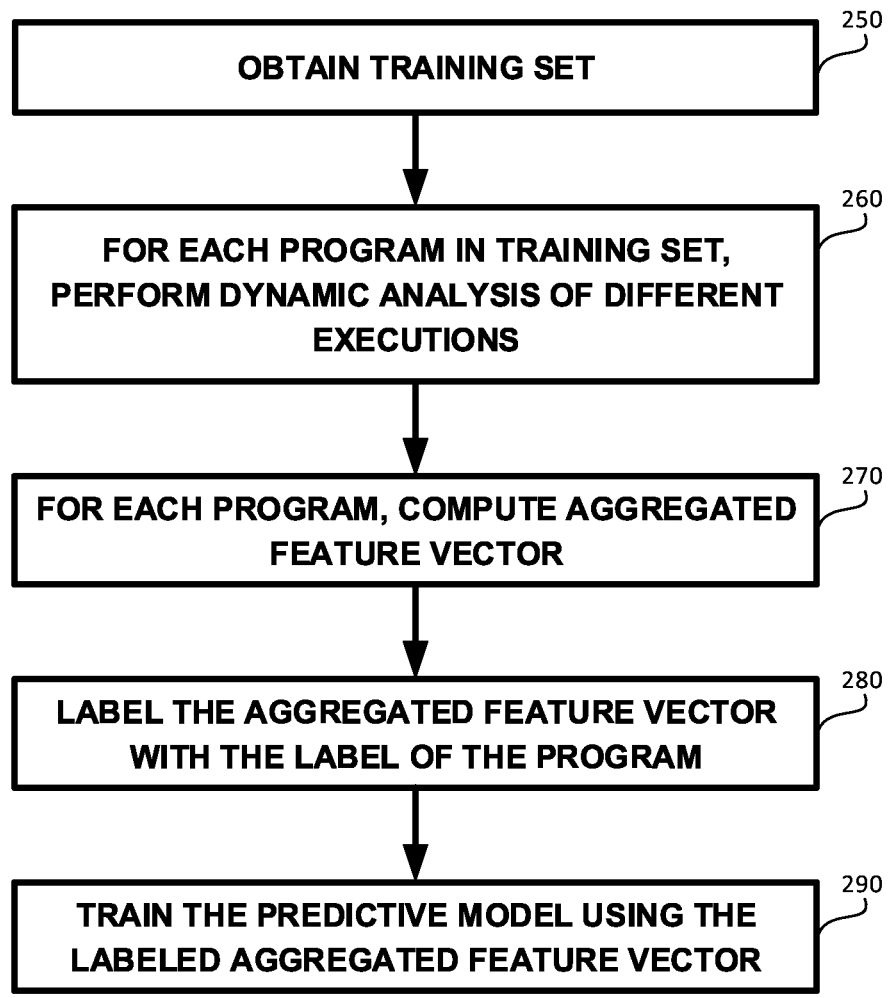

Referring now to FIG. 2B showing a flowchart diagram of a method, in accordance with the disclosed subject matter.

On Step 250, a training set may be obtained. The training set may comprise labeled programs. Each program may be labeled as benign or malware. In some exemplary embodiments, some of the malware programs may be configured to demonstrate malicious activity only in a subset of the execution paths.

On Step 260, each program in the label set may be analyzed. In some exemplary embodiments, each program may be analyzed using dynamic analyses of different executions thereof. Each program may be analyzed similarly to the analysis of Step 200.

On Step 270, an aggregated feature vector may be computed. The aggregated feature vector may be computed in a similar manner to that disclosed with respect to Step 220 (and potentially while first obtaining the measurements as disclosed with respect to Step 210).

On Step 280, the aggregated feature vector that is computed for a program is labeled with the label of the program, as indicated in the training set.

On Step 290, a predictive model may be trained. The training may be performed using a training set comprised of pairs of aggregated feature vectors and their respective labels, as set on Step 280.

Figure 3:
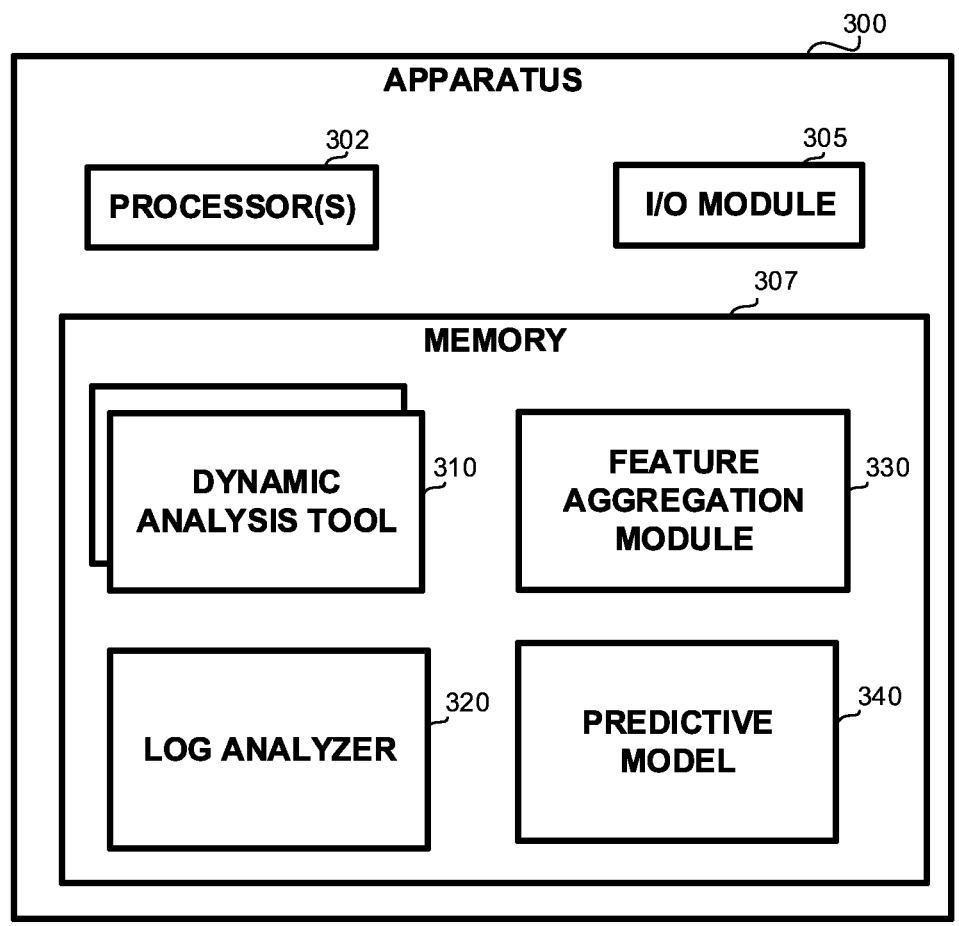
FIG. 3 shows an apparatus, in accordance with some exemplary embodiments of the disclosed subject matter.

Referring now to FIG. 3 showing an apparatus, in accordance with some exemplary embodiments of the disclosed subject matter. Apparatus 300 may be configured to perform the steps described in FIGS. 2A-2B or portions thereof.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 305. I/O Module 305 may be utilized to provide an output to and receive input from a user, to receive or transmit communications from other devices, or the like.

In some exemplary embodiments, Apparatus 300 may comprise a Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

Dynamic Analysis Tool(s) 310 may be configured to perform dynamic analysis. In some exemplary embodiments, Dynamic Analysis Tools 310 may be different tools, a same tool using different configurations, or otherwise configured to stimulate different execution path of the analyzed program.

Log Analyzer 320 may be configured to analyze a log or other report provided by Dynamic Analysis Tools 310. In some exemplary embodiments, Log Analyzer 320 may be configured to analyze the log and extract a feature vector for each analyzed execution. Additionally or alternatively, Log Analyzer 320 may be configured to obtain and compute, based on the log, measurements useful in accordance with the disclosed subject matter.

Feature Aggregation Module 330 may be configured to generate an aggregated feature vector. In some exemplary embodiments, Feature Aggregation Module 330 may aggregate feature vectors that represent executions of different execution paths. Additionally or alternatively, Feature Aggregation Module 330 may be configured to generate the aggregated feature vector based on crude measurements and not necessarily using feature vectors of each execution.

Predictive Model 340 may be configured to estimate for an aggregated feature vector whether the program represented thereby is malware or benign. Predictive Model 340 may be trained using a training set before use thereof to classify programs.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
   obtaining a first set of measurements produced by a first dynamic analysis of an examined program, wherein the first dynamic analysis is performed with respect to the examined program executing a first execution path;
   obtaining a second set of measurements produced by a second dynamic analysis of the examined program, wherein the second dynamic analysis is performed with respect to the examined program executing a second execution path, wherein the first and second execution paths are different;
   generating an aggregated feature vector representing the examined program, wherein the aggregated feature vector comprises a set of aggregated features, wherein a value of each aggregated feature is based on an aggregation of corresponding measurements in the first set of measurements and in the second set of measurements; and
   applying a predictive model on the aggregated feature vector to classify the examined program as malicious or benign.

2. The method of claim 1 further comprises performing the first dynamic analysis and the second dynamic analysis.

3. The method of claim 1 further comprises training the predictive model, wherein said training comprises:
   performing multiple dynamic analysis on each labeled program in a training set, wherein the training set comprises labeled programs, wherein each labeled program is labeled as malicious or benign, wherein labeled programs having a malicious label exhibit malicious functionality in a subset of execution paths thereof;
   generating for each labeled program the aggregated feature vector, whereby obtaining labeled aggregated feature vectors; and
   training the predictive model using the labeled aggregated feature vectors.

4. The method of claim 1, wherein the set of aggregated features comprises an aggregated Uniform Resource Identifier (URI) feature, wherein the aggregated URI feature comprises a list of all URIs contacted by the examined program in any of the execution paths.

5. The method of claim 1, wherein the set of aggregated features comprises an aggregated created file feature, wherein the aggregated created file feature comprises a list of all files created by the examined program in any of the execution paths.

6. The method of claim 1, wherein the set of aggregated features comprises an aggregated functionality count feature, wherein the aggregated functionality count feature comprises a count of a number utilizations of a functionality identified in all of the execution paths.

7. The method of claim 6, wherein the functionality is an anti-debug pattern.

8. The method of claim 6, wherein the functionality is an invocation of an Application Programming Interface (API) function of an Operating System (OS) or of an hardware instruction.

9. The method of claim 1, wherein the set of aggregated features comprises an aggregated memory entropy feature, wherein the aggregated memory entropy feature indicates an aggregated entropy of dynamically created memory during execution in all of the execution paths.

10. The method of claim 1, wherein the set of aggregated features comprises a maximal string deviation feature, wherein the maximal string deviation feature comprises a maximal deviation of strings that are dynamically created during execution in all of the execution paths.

11. A computer program product comprising a computer readable storage medium retaining program instructions, which program instructions when read by a processor, cause the processor to perform a method comprising:
   obtaining a first set of measurements produced by a first dynamic analysis of an examined program, wherein the first dynamic analysis is performed with respect to the examined program executing a first execution path;
   obtaining a second set of measurements produced by a second dynamic analysis of the examined program, wherein the second dynamic analysis is performed with respect to the examined program executing a second execution path, wherein the first and second execution paths are different;
   generating an aggregated feature vector representing the examined program, wherein the aggregated feature vector comprises a set of aggregated features, wherein a value of each aggregated feature is based on an aggregation of corresponding measurements in the first set of measurements and in the second set of measurements; and
   applying a predictive model on the aggregated feature vector to classify the examined program as malicious or benign.

12. The computer program product of claim 11, wherein the method further comprises performing the first dynamic analysis and the second dynamic analysis.

13. The computer program product of claim 11, wherein the method further comprises training the predictive model, wherein said training comprises:
  performing multiple dynamic analysis on each labeled program in a training set, wherein the training set comprises labeled programs, wherein each labeled program is labeled as malicious or benign, wherein labeled programs having a malicious label exhibit malicious functionality in a subset of execution paths thereof;
  generating for each labeled program the aggregated feature vector, whereby obtaining labeled aggregated feature vectors; and
  training the predictive model using the labeled aggregated feature vectors.

14. The computer program product of claim 11, wherein the set of aggregated features comprises an aggregated Uniform Resource Identifier (URI) feature, wherein the aggregated URI feature comprises a list of all URIs contacted by the examined program in any of the execution paths.

15. The computer program product of claim 11, wherein the set of aggregated features comprises an aggregated created file feature, wherein the aggregated created file feature comprises a list of all files created by the examined program in any of the execution paths.

16. The computer program product of claim 11, wherein the set of aggregated features comprises an aggregated functionality count feature, wherein the aggregated functionality count feature comprises a count of a number utilizations of a functionality identified in all of the execution paths.

17. The computer program product of claim 16, wherein the functionality is selected from the group consisting of an anti-debug pattern, an invocation of an Application Programming Interface (API) function of an Operating System (OS) or of an hardware instruction.

18. The computer program product of claim 11, wherein the set of aggregated features comprises an aggregated memory entropy feature, wherein the aggregated memory entropy feature indicates an aggregated entropy of dynamically created memory during execution in all of the execution paths.

19. The computer program product of claim 11, wherein the set of aggregated features comprises a maximal string deviation feature, wherein the maximal string deviation feature comprises a maximal deviation of strings that are dynamically created during execution in all of the execution paths.

20. A computerized apparatus having a processor, the processor being adapted to perform the steps of:
  obtaining a first set of measurements produced by a first dynamic analysis of an examined program, wherein the first dynamic analysis is performed with respect to the examined program executing a first execution path;
  obtaining a second set of measurements produced by a second dynamic analysis of the examined program, wherein the second dynamic analysis is performed with respect to the examined program executing a second execution path, wherein the first and second execution paths are different;
  generating an aggregated feature vector representing the examined program, wherein the aggregated feature vector comprises a set of aggregated features, wherein a value of each aggregated feature is based on an aggregation of corresponding measurements in the first set of measurements and in the second set of measurements; and
  applying a predictive model on the aggregated feature vector to classify the examined program as malicious or benign.

* * * * *